US010315859B1

(12) United States Patent
Zhao et al.

(10) Patent No.: US 10,315,859 B1
(45) Date of Patent: Jun. 11, 2019

(54) AUTOMATIC SINGULATION OF ITEMS

(71) Applicant: Amazon Technologies, Inc., Seattle, WA (US)

(72) Inventors: Longyu Zhao, Seattle, WA (US); Martin Peter Aalund, Seattle, WA (US); Stephanie Tomasetta, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/464,087

(22) Filed: Mar. 20, 2017

(51) Int. Cl.
 B65G 47/76 (2006.01)
 B65G 15/24 (2006.01)
 B65G 47/68 (2006.01)
 B65G 43/08 (2006.01)
 B65G 47/82 (2006.01)
 B65G 47/31 (2006.01)

(52) U.S. Cl.
 CPC ........... B65G 47/766 (2013.01); B65G 15/24 (2013.01); B65G 43/08 (2013.01); B65G 47/31 (2013.01); B65G 47/68 (2013.01); B65G 47/82 (2013.01); B65G 2811/0657 (2013.01)

(58) Field of Classification Search
 CPC .............. B65G 15/24; B65G 21/2054; B65G 21/2063; B65G 21/2072; B65G 43/08; B65G 47/1492; B65G 47/244; B65G 47/28; B65G 47/30; B65G 47/31; B65G 47/68; B65G 47/685; B65G 47/763; B65G 47/766; B65G 47/82; B65G 47/8815; B65G 47/8823; B65G 47/8892; B07C 1/04

USPC ......................... 198/444, 452, 453, 454, 455
See application file for complete search history.

(56) References Cited

U.S. PATENT DOCUMENTS

| 5,423,431 A | * | 6/1995 | Westin | ..................... B07C 5/02 209/539 |
| 5,460,271 A | * | 10/1995 | Kenny | ..................... B07C 5/02 198/453 |
| 5,638,938 A | * | 6/1997 | Lazzarotti | ................. B07C 1/02 198/358 |
| 5,788,053 A | * | 8/1998 | Glawitsch | .......... B65G 47/1492 198/396 |
| 5,950,800 A | * | 9/1999 | Terrell | ............... B65G 47/1492 198/448 |
| 6,259,967 B1 | * | 7/2001 | Hartlepp | .............. B65G 11/081 198/444 |

(Continued)

*Primary Examiner* — Gene O Crawford
*Assistant Examiner* — Keith R Campbell
(74) *Attorney, Agent, or Firm* — Kilpatrick Townsend & Stockton LLP

(57) ABSTRACT

Singulation system may utilize various features to singulate items, e.g., which may be different sizes from one another. For example, a conveyor may advance items along the length of the conveyor, and paddles arranged for protruding over respective portions of the conveyor may be selectively positionable based on conditions (such as a size or a jammed state) of items detected as present on a relevant part of the conveyor. Additionally or alternatively, a first conveyor may advance items at a first speed and in a first direction to sequentially drop the items onto a second conveyor positioned below the first conveyor, and the second conveyor may advance the received items at a second speed higher than the first speed and in a second direction different from the first direction, e.g., to increase space between items.

27 Claims, 6 Drawing Sheets

(56) References Cited

U.S. PATENT DOCUMENTS

| | | | | |
|---|---|---|---|---|
| 6,609,607 B2* | 8/2003 | Woltjer | ............... | B65G 37/02 |
| | | | | 198/457.03 |
| 7,012,210 B2* | 3/2006 | Kibbler | ................ | B07C 1/02 |
| | | | | 198/444 |
| 9,630,784 B2* | 4/2017 | Ragan | ................ | B65G 47/32 |
| 2017/0362036 A1* | 12/2017 | Hartmann | ........... | G05B 19/418 |

* cited by examiner

AUTOMATIC SINGULATION OF ITEMS

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. One area in particular in which utilization of system resources be made more efficient is the re-organization of items from within mixed groups into individually accessible units.

BRIEF DESCRIPTION OF THE DRAWINGS

Various embodiments in accordance with the present disclosure will be described with reference to the drawings, in which.

DETAILED DESCRIPTION

Figure 1:
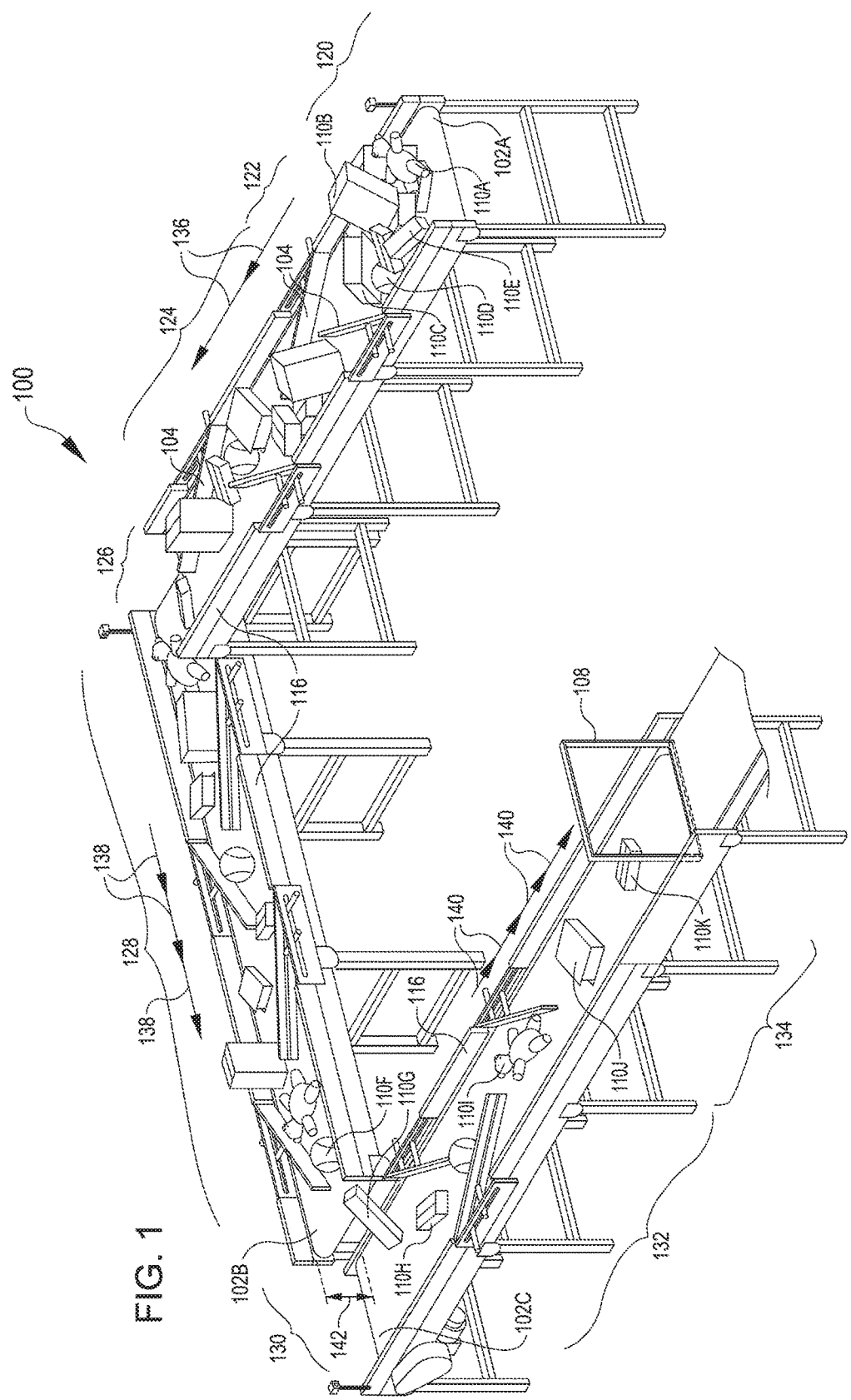
FIG. 1 illustrates an example of a singulation system in which inventory items are being singulated from within mixed groups into individually accessible units according to certain embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to singulation systems, for example, which may find particular use in inventory systems that operate with a large variety of non-identical items. Such singulation systems may utilize a series of conveyors and/or paddles to cause items that may have been clustered together to become separated from one another. For example, the singulation systems may introduce gaps between items such that the items can be individually scanned and/or otherwise processed at certain locations within an inventory system. In various embodiments, the arrangement of conveyors and/or paddles can accommodate singulation of a group that features various sizes and/or types of items mixed together. Such singulation of mixed input is generally not feasible with arrangements commonly found in manufacturing or other production facilities, which are typically designed to accommodate only a known single size of identical items.

In accordance with an embodiment, a singulation system includes a conveyor onto which a variety of items are deposited, e.g., in response to being dumped from a tote or other container. A series of paddles are positioned along the length of the conveyor and function as obstructions to items as the items are moved along by the conveyor. For example, a paddle may be angled across a subsection of a width of the conveyor so that any item striking the paddle will be forced to slide along the paddle's length until releasing past the end of the paddle to continue along the course of the conveyor. Items adjacent one another on the conveyor may reach the paddle at slightly different times and/or contact the paddle in different manners. These different interactions of adjacent items with the paddle may impart different friction forces or other reorienting effects that may cause the items to move out of a stacked relationship or otherwise separate from one another. For example, one item may become temporarily "stuck" against the paddle while another item is moved by the conveyor into a different position that frees the first item. As an illustrative example, if a book is sitting on top of a movie, a corner of the book may strike the paddle before the movie reaches the paddle and cause the book to shift from a position on top of the movie to a position alongside the movie on the conveyor.

In various embodiments, paddles may be actively manipulated to facilitate operation of the singulation system. As non-limiting examples, paddles may be capable of translating, pivoting, raising, lowering, extending, and/or retracting. For example, a paddle may be manipulated so that an amount of the conveyor that is obstructed may be increased (such as to allow larger items to fit past the paddle) or decreased (such as to decrease a number of smaller items that can fit by the paddle at once). In various embodiments, paddles may be manipulated based on sensor input, such as optical sensors or pressure sensors. For example, a computer controller may use a camera to detect relevant sizes of items on the conveyor and actuate a paddle to change an amount of the conveyor that is obstructed to better match the size of the detected items. As another example, a computer controller may use a pressure sensor on a paddle to detect that several items have jammed together against the paddle and consequently actuate the paddle to allow the items to pass by and continue travel along the conveyor.

In various embodiments, relevant changes to items may be imparted by conveyors in addition to or in lieu of changes imparted by paddles. In some embodiments, one conveyor may be arranged relative to another conveyor so that an item will undergo a change in direction, elevation, speed, and/or momentum as a result of being transferred from one conveyor to the other. Such changes may facilitate singulation. For example, in some embodiments, a first conveyor may convey items at a first speed along its length and upon reaching its end, drop those items onto a second conveyor positioned below it. The drop may cause items to re-orient during the fall, which may result in separation between items that facilitates singulation. For example, a book stacked on a movie prior to a drop may be unlikely to remain or land stacked on the movie after both drop. Moreover, the second conveyor may convey the items at a second speed (e.g., higher than the speed of the first conveyor). This may also facilitate singulation by fostering larger gaps between items on the second conveyer than gaps on the first conveyor. For example, if a book is behind an action figure by a first gap when on the first conveyor, the action figure will drop first and land on the second conveyor and be carried away at the new, higher, second speed of the second conveyor for the same amount of time that it will take for the book to travel the distance of the first gap to fall from the first conveyor onto the second conveyor. As a result, the action figure will have travelled a longer distance in the same amount of time, and the space between the action figure and the book will thus have increased.

Reference will now be made to the Figures, in which like reference numerals refer to like elements throughout the Figures. In many instances, similar elements may be identified by the same reference numeral and differentiated by a different letter suffix in the Figures. Thus in the following text description, elements may be referenced with suffixes (e.g., for referencing individual or specific elements such as a first conveyor 102B or a second conveyor 102C) or without suffixes (e.g., for generally or collectively referencing elements such as one or more of the conveyors 102).

Figure 2:
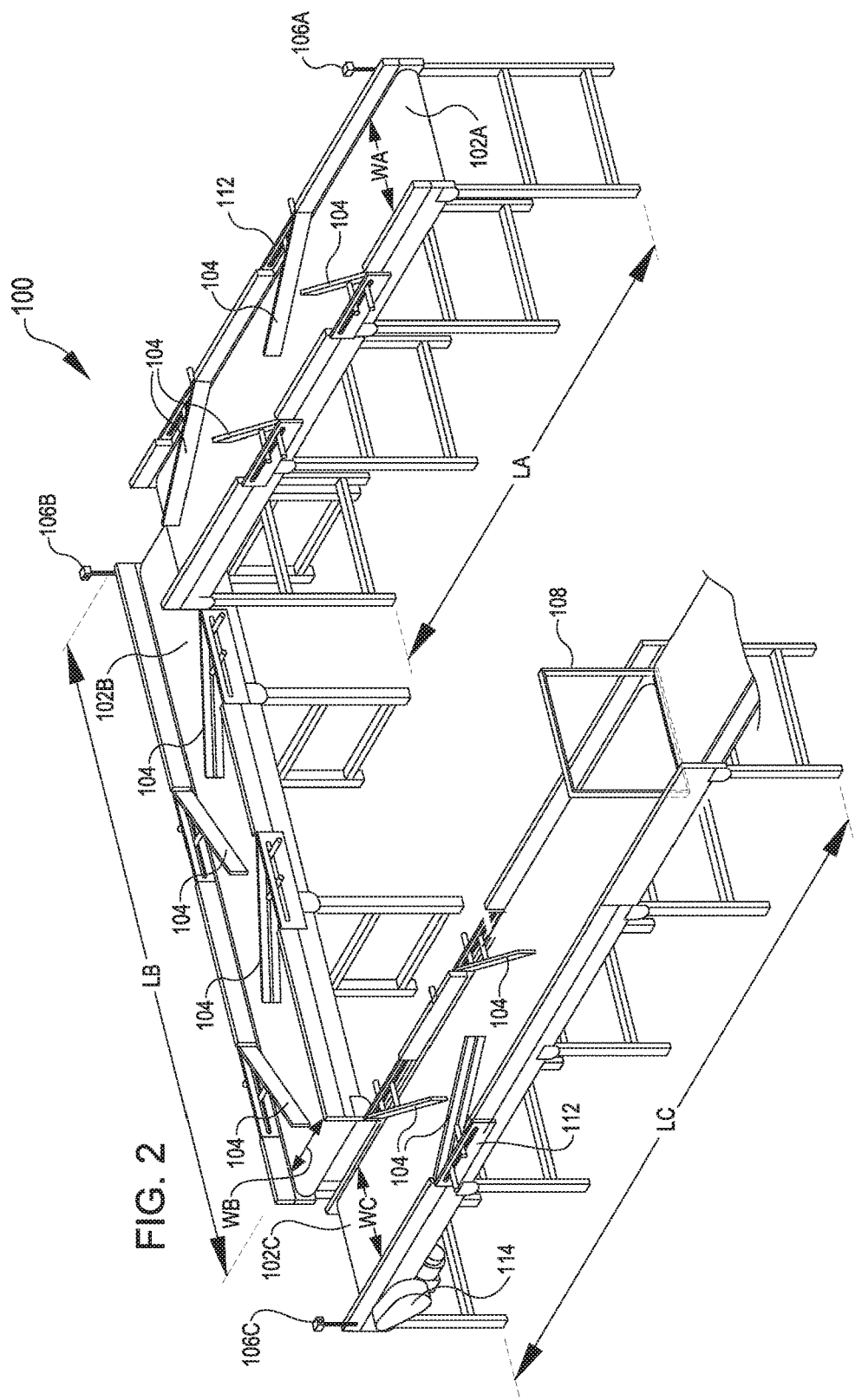
FIG. 2 illustrates the singulation system of FIG. 1 with the items removed according to certain embodiments.

FIGS. 1-2 illustrates an example of a singulation system 100 according to certain embodiments. FIG. 1 illustrates the singulation system 100 in operation with items 110, and FIG. 2 illustrates the singulation system 100 in the absence of items 110 (e.g., so as to more easily identify other elements). As may be more easily seen in FIG. 2, the singulation system 100 shown in FIGS. 1-2 includes conveyors 102, paddles 104, optical sensors 106, and a scanner 108.

Referring back to FIG. 1, in operation, the singulation system 100 may function to singulate the items 110. For example, the items 110 at 120 are shown piled together with little if any separation present between adjacent items 110, yet after progressing through the singulation system 100, each of the items 110 (e.g., at 134) may be each spaced apart from the next item 110 in sequence. More generally, singulation generally refers to the act or process of separating conjoined or grouped units into individual parts or pieces, and as used herein, may include an overall process or any subportion thereof. Thus, singulation as used herein may include actions that increase a degree of separation between items 110, including actions that completely separate one item 110 from all other items 110, actions that add only some modicum of re-alignment or re-orientation between any two items 110 (e.g., which may facilitate introduction of separation later on), and actions that may have greater or lesser effects than those just described.

The singulation system 100 may be utilized to singulate items 110 of many different varieties from one another. For example, the items 110 in FIG. 1 are shown at 120 introduced into the singulation system 100 in a mixed group that includes such varied items 110 as a teddy bear 110A, an action figure 110B, a book 110C, a ball 110D, and a rectangular box 110E. These items 110 are shown and described by way of example of different sorts of items 110 that may be maintained for fulfilling orders from a mail order warehouse or other fulfillment center in which the singulation system 100 may find particular use. However, the singulation system 100 is not limited to such items 110 or environments and may be implemented with other items 110 and/or environments. In FIG. 1, the singulation system 100 is shown singulating the items 110 to facilitate passage through a scanner 108 for identifying the individual items, although the singulation system 100 may additionally or alternatively be useful for other actions or purposes related to the items 110. As non-limiting examples, the singulation system 100 additionally or alternatively may singulate the items 110 to facilitate operations by robotic manipulators relative to the items 110, diversion of separate items 110 to separate locations, inspection of separate items 110, etc.

The singulation system 100 may utilize various features to facilitate singulation of varied items 110. For example, in various embodiments, the singulation system 100 utilizes a combination of conveyors 102 and paddles 104 to facilitate singulation. In FIGS. 1-2, the conveyors 102 are depicted as motorized belts. However, the conveyors 102 additionally or alternatively may correspond to series of rollers or any suitable structure or combinations of structures for advancing items 110 through the singulation system 100. In FIGS. 1-2, three conveyors 102A, 102B, and 102C are shown, although the singulation system 100 may include a set of conveyors 102 with any number of conveyors 102, including one, two, three, or more than three. Generally, in FIG. 1, each conveyor 102 is shown advancing items along a length of the conveyor 102, and opposite sides of a width of the conveyor 102 is bound by runners 116 that prevent items 110 from being pushed over a lateral side of the conveyor 102.

The paddles 104 are depicted in FIGS. 1-2 as flat blades that project out over the conveyors 102. However, the paddle 104 additionally or alternatively may correspond to any other shape or form of structure or member that can protrude over some portion of the set of conveyors 102 and provide a physical barrier to items 110. The paddles 104 may disrupt movement or motion paths of items 110 that would otherwise occur in response to operation of the conveyors 102 in the absence of the paddles 104. Although the paddles 104 are all depicted alike in FIGS. 1-2, the paddles 104 may vary from one another and/or from the form shown in FIGS. 1-2. Some variations are described further, for example, with respect to FIGS. 3A-3C and 4. Furthermore, although the paddles 104 are shown fixed relative to bases 112 in FIGS. 1-2, in some embodiments, the paddles 104 may be selectively positionable or otherwise adjustable, such as in response to control mechanisms located in the bases 112 or in other relation to the paddles 104. In some embodiments, the paddles 104 may be actuatable based on input from optical sensors 106, e.g., which may be arranged with a field of view that includes a relevant part of the conveyor 102, paddles 104, and/or items 110. Pressure sensors and/or other types of sensors may also be associated with relevant parts of the conveyor 102, paddles 104, and/or other elements and utilized to provide input for detecting conditions present for associated elements and making determinations about actuation of paddles 104.

In operation, the paddles 104 may create a serpentine or circuitous path that for the items 110 to travel to continue advancing by the conveyors 102. Such a circuitous path may include bottlenecks or other restrictions that permit only a limited number of items 110 through at a time, which may improve singulation of the items 110. For example, referring to FIG. 1, items introduced in a pile at 120 (e.g., in response to being dumped from a tote or other container or being collected from another source) may be advanced by the conveyor 102A toward a first set of paddles 104 at 122 and a second set of paddles 104 at 124. As may be appreciated in FIG. 1, items 110 at 124 that have passed several paddles 104 appear more spread out than items 110 at 120 that have not yet passed by any paddles 104. Similar expanding of gaps between items 110 may be appreciated with reference to portions of the conveyors 102 that feature other paddles 104 at 128 and 132 in FIG. 1.

In various embodiments, the paddles 104 may be angled relative to the length and/or width of the conveyor 102. For example, in FIG. 2, each of the paddles 104 over the right-most conveyor 102A are angled relative to a length LA of the right-most conveyor 102A and angled relative to a width WA of the right-most conveyor 102A. An angled orientation may cause a paddle 104 to contact adjacent items 110 at different times. As an example with reference again to the right-most conveyor 102A in FIG. 2, an angled orientation may cause a paddle 104 to contact an item 110 located at an edge of the width WA of the right-most conveyor 102A before the paddle 104 contacts another item 110 located in the middle of the width WA of the right-most conveyor 102A. Contacting adjacent items 110 at different times may cause different friction forces to be applied to adjacent items 110, may resist movement of adjacent items 110 separately, and may cause adjacent items 110 to begin to move separately in a manner that may facilitate singulation.

In various embodiments, the singulation system 100 utilizes the arrangement of successive conveyors 102 to facilitate singulation. The arrangement of successive conveyors 102 may be utilized to provide changes in altitude, speed, and/or direction that can facilitate singulation. For example, referring to FIG. 1, the conveyors 102 are arranged to provide all three of these changes at each of 126 and 130. With reference to the two conveyors 102A and 102B at 130, the first conveyor 102B advances items 110 along a first length LB at a first speed (illustrated by the number of arrows 138) toward the second conveyor 102C. This causes the items 110 to sequentially drop off of the first conveyor 102B. The second conveyor 102C is positioned below the first conveyor 102B by a set height 142 such that the second conveyor 102C sequentially receives the items 110 dropped from the first conveyor 102B. This drop may allow items 110 to reorient during freefall, which may cause items 110 to move separately from one another and facilitate singulation. The second conveyor 102C advances items 110 along a second length LC at a second speed (illustrated by a greater number of arrows 140 than the number of arrows 138). This difference in speed may cause items 110 that are still on the first conveyor 102B to travel less distance than items 110 that have progressed onto the second conveyor 102C in the amount of time until the items from the first conveyor 102B reach the second conveyor 102C. Thus, gaps between items 110 may be increased by the increase in speed between the first conveyor 102B and the second conveyor 102C. The second conveyor 102C is also arranged to provide a direction change relative to the first conveyor 102B (e.g., the second conveyor 102C is non-parallel to the first conveyor 102B). These changes in direction, altitude, and/or speed as items 110 shift between conveyors 102 (as at 126 or 130 in FIG. 1) may generally cause items 110 to move differently or separately from one another (e.g., one item may begin to move a new way before the next item reaches the point of transition to begin moving the new way). Such difference in movement between items 110 may facilitate singulation individually and/or collectively.

Any suitable variations in height, speed, and/or direction may be provided by the arrangement of the set of conveyors 102. In some embodiments, variations may be related to items 110 to be singulated and/or capabilities of other elements that operate relative to those items 110. In some embodiments, a size of each respective item 110 may correspond to the item's maximum dimension (e.g., the largest among height, width, length, diameter, or other dimension of the item 110). As an illustrative example, the singulation system 100 in some embodiments may process items 110 having maximum dimensions ranging between 1 inch and 18 inches. In some embodiments, the set height 142 between consecutive conveyors 102 may range between 2 inches and 24 inches, or between 5 inches and 10 inches, or between some other range, e.g., which may be based on a size of items 110 processed by the singulation system 100. In some embodiments, the speed of the conveyors 102 may be related to a speed at which the scanner 108 can detect items 110 passing through, a speed at which robotic manipulators can perform actions on items 110 advanced by the conveyors 102, or some other constraint relating to operations to be performed relative to items 110. As an illustrative example, some scanners 108 may be capable of detecting items 110 moved by conveyors 102 at speeds of up to 400 feet per minute. In some embodiments, a speed change between consecutive conveyors 102 may vary by different percentages or amounts. As non-limiting examples, a speed increase of between 20% and 200% may be implemented between consecutive conveyors. As an illustrative example referring to FIG. 1, the right-most conveyor 102A may be operated at 40 feet per minute, the middle conveyor 102B may be operated at 60 feet per minute (e.g., a 50% increase), and the left-most conveyor 102C may be operated at 100 feet per minute (e.g., a 67% increase). However, other increments and/or percentage changes may be also be implemented to accomplish singulation. Additionally, although the conveyors 102 are shown in FIGS. 1 and 2 as providing a 90 degree change in direction, other changes in direction are also possible for facilitating singulation. As non-limiting examples, the conveyors 102 may provide a 45 degree change in direction between consecutive conveyors 102, a 180 degree change (e.g., as in FIG. 5), an amount between 45 degrees and 180 degrees, another amount, or another range. In some embodiments, successive conveyors 102 may provide the same or different amounts of change of direction than between earlier conveyors 102 in sequence.

Figure 3A:
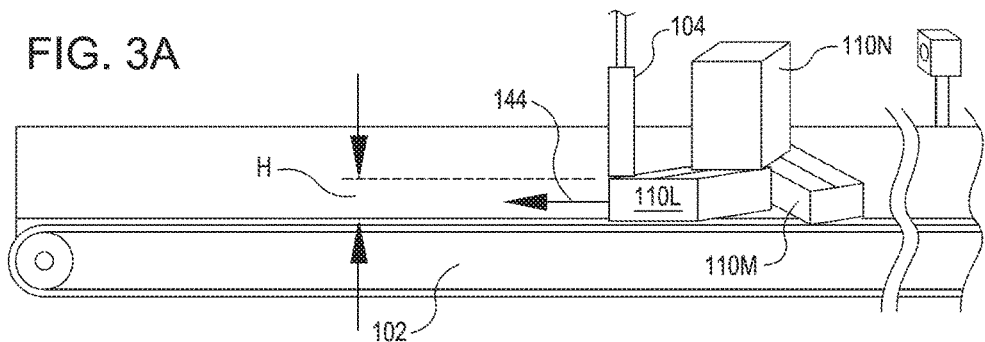
FIGS. 3A-3C illustrate operation of a paddle within a singulation system according to certain embodiments.
Figure 3B:
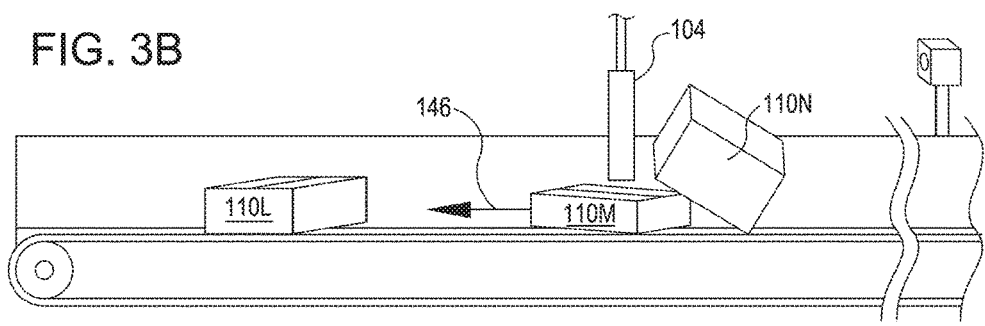
Figure 3C:
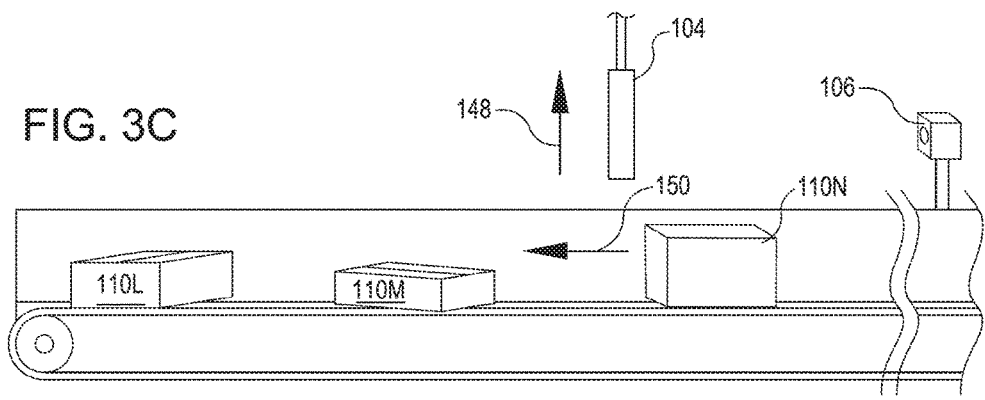

In some embodiments, a paddle 104 may be movable relative to a conveyor 102. For example, the paddle 104 by generally arranged for protruding over a respective portion of the conveyor 102 and may include a member or other structure selectively positionable among different positions relative to that respective portion of the conveyor 102. FIGS. 3A-3C show a sample operation for a paddle 104 that is selectively positionable for vertical movement relative to the conveyor 102.

In the illustrative example shown in FIG. 3A, a pile of items 110 (including a first package 110L, a second package 110M stacked partly on top of the first package 110L, and an action FIG. 110N resting atop both the first package 110L and the second package 110M) advance toward a paddle 104. The paddle 104 is vertically offset from the conveyor 102 by a distance in a height direction H that permits the first package 110L to pass underneath, as illustrated by arrow 144. However, the vertical offset is too short to allow passage of the second package 110M and action FIG. 110N while still atop the first package 110L. As a result, the second package 110M and action FIG. 110N are knocked off, e.g., resulting in the arrangement shown in FIG. 3B. As shown in FIG. 3B, the second package 110M (now no longer atop the first package 110L) is also short enough to pass underneath the vertical offset between the paddle 104 and conveyor 102, e.g., as illustrated by arrow 146. This may also succeed in knocking the action FIG. 110N off if still atop the second package 110M, e.g., resulting in the arrangement shown in FIG. 3C. In FIG. 3C, the action figure may still be too large to fit under the vertical offset between the paddle 104 and the conveyor 102. This may result in a blockage that may be detected, for example, by an optical sensor 106 that is arranged to include this part of the conveyor within the field of view of the optical sensor 106. Based on the detection, the paddle 104 may be actuated to lift (e.g., illustrated by arrow 148) and provide enough vertical offset to allow the action FIG. 110N to pass underneath (e.g., as illustrated by arrow 150). The paddle 104 may also be lowered back to its original position after the blockage is cleared.

Figure 4:
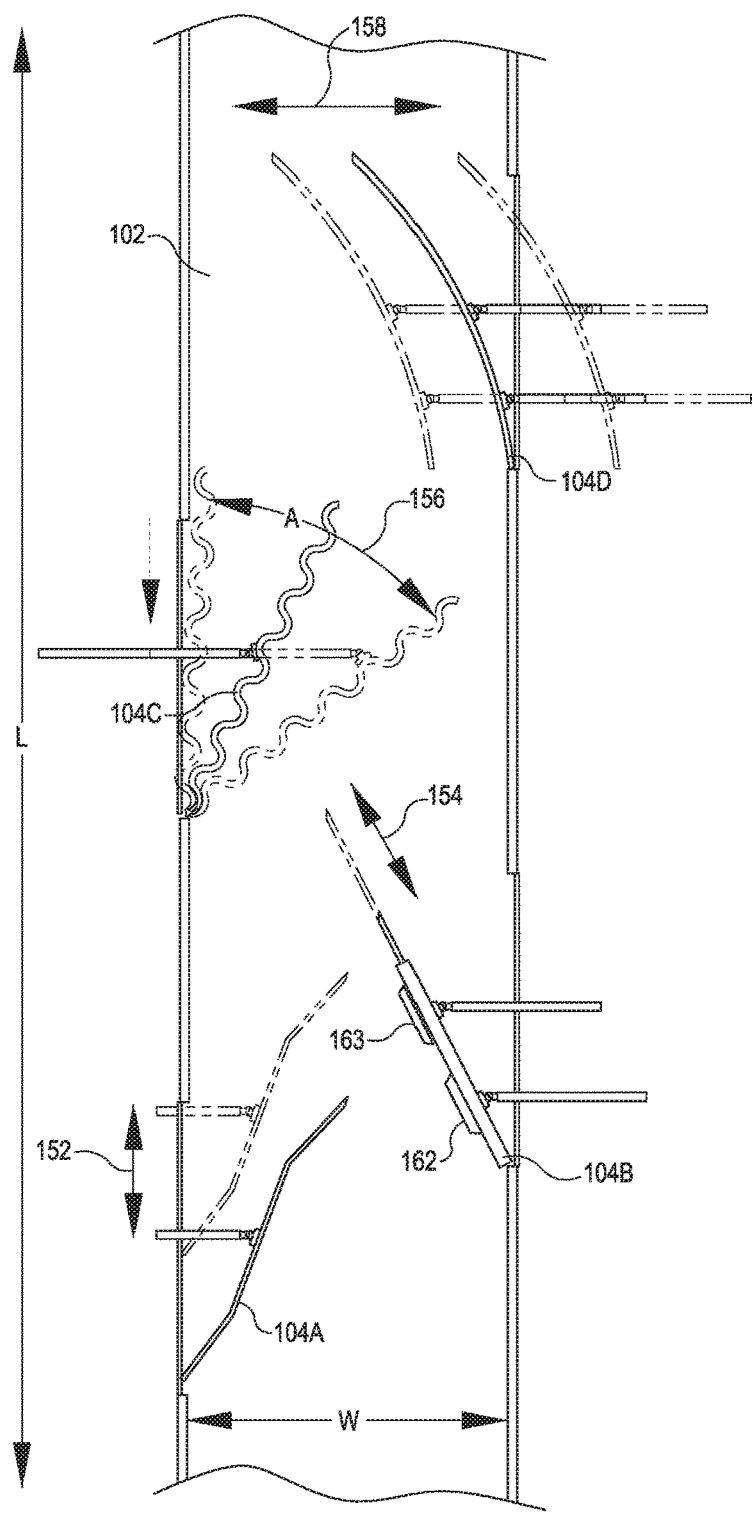
FIG. 4 illustrates various types of paddles that may be utilized within a singulation system according to certain embodiments.

Paddles 104 may be additionally or alternatively movable relative to conveyors 102 in other manners. FIG. 4 illustrates various examples of types of paddles 104 that may be utilized according to certain embodiments. As illustrated by doubleheaded arrow 152, a paddle 104A may be configured for translation along the length direction L of the conveyor 102 (e.g., in a forward or backward direction). As illustrated by doubleheaded arrow 154, a paddle 104B may be configured for extending and/or retracting relative to the conveyor 102 (e.g., in a forward or backward direction). As illustrated by doubleheaded arrow 156, a paddle 104C may be configured for pivoting about a pivot point of the paddle 104C relative to the conveyor 102 (e.g., a rotating motion). As illustrated by doubleheaded arrow 158, a paddle 104D may be configured for translation along the width direction W of the conveyor 102 (e.g., in a left or right direction). A paddle 104 and/or associated base 112 may include any suitable actuators to accomplish such functionality, including, but not limited to, actuators that utilize e.g., solenoids, hydraulics, or pneumatics.

Any suitable variations in movement or coverage of paddles 104 may be utilized by the singulation system 100. For example, the paddles 104 may be controlled to extend across any suitable amount of the width W of the conveyor 102. In some examples, the paddle 104 may be actuatable to extend across 0% of the width W (e.g., to remove any obstruction that may be generating a jam of items 110 on the conveyor 102 by the paddle 104), to extend across 100% of the width W (e.g., to temporarily prevent additional items 110 from passing the paddle 104 so as to allow additional space to be introduced behind an item 110 that passed the paddle 104 prior to the complete blockage by the paddle 104), or any other suitable amount or range in between. For example, paddles 104 may extend across 10%, 20%, 30%, 40%, 50%, 60% 70%, 80%, 90% or other amounts or ranges therebetween of the width W, e.g., so as to introduce variable spacing depending on relative sizes of items 110. Similarly, for pivoting, such as by the paddle 104C in FIG. 4, a paddle may be capable of pivoting through an angle A to zero degrees deviation from the length L (e.g., to remove any obstruction that may be generating a jam of items 110 on the conveyor 102 by the paddle 104), to 90 degrees deviation from the length L (e.g., to temporarily completely block off the width W), to greater than 90 degrees deviation from the length L (e.g., to provide a resulting partial blockage of the width W), or to any other suitable amount or range.

Moreover, paddles 104 can include any suitable material. Suitable materials for paddles 104 may include rigid or semi-rigid materials, including, but not limited to plastic, metal, rubber, foam, wood, other natural materials, other synthetic materials, or combinations thereof. Paddles 104 can include any surface treatment or combination of differing surface characteristics. Non-limiting examples include tacky material to increase friction, or smooth or slippery material to decrease friction.

Paddles 104 may include features mounted on and/or otherwise coupled with the paddles 104. For example, paddles 104 may include item-manipulating features (shown e.g., as a functional block 162 on paddle 104B in FIG. 4), such as air jets to reduce friction or impart force on items 110, or vibratory elements to reduce friction or otherwise encourage movement of items 110 relative to the paddles 104.

Paddles 104 may additionally or alternatively include item-detecting features (shown e.g., as a functional block 163 on paddle 104B in FIG. 4), such as sensors to detect the presence, characteristics, and/or effects of items 110 relative to a paddle 104. As one example, an item-detecting feature 163 may include an optical sensor (e.g., in lieu of or in addition to an optical sensor 106 shown remote from the paddle 104 in FIG. 1) or other sensor for determining size or other characteristics of items 110 that may be utilized to determine whether and how to actuate a corresponding paddle 104. As another example, an item-detecting feature 163 may correspond to a force or pressure sensor on the paddle 104 that can detect forces exerted on the paddle 104 by items 110 moved by the conveyor 102. In normal operation, such a force sensor 163 in a given time interval may register fluctuating forces, for example, registering spikes of force corresponding to items 110 colliding with the paddle 104 and registering troughs or cessations of force corresponding to the items 110 releasing from contact with the paddle 104 and continuing along the conveyor 102 past the paddle 104. In contrast, a detected prolonged ongoing force or pressure over a magnitude threshold and/or time threshold may correspond to items 110 being jammed and continuing to press against the paddle 104 instead of travelling past. Paddles 104 accordingly may be actuated based on analysis of such time-varying signals from force sensors 163, for example, based on whether input from the force sensors 163 indicate a blockage is present or not. Non-limiting examples of force sensors 163 that may be utilized include piezoelectric sensors, strain gauges, and optical sensors for detecting deflection of relevant structures of paddles 104. In some embodiments, paddles 104 may be actuated based on a force detected being above a threshold and/or based on other criteria related to forces detected by a force sensor 163.

Paddles 104 may feature any suitable form factor. For example, although the paddles 104 illustrated in FIG. 1 are shown as flat, uniform blades, paddles 104 are not so limited. In some embodiments, paddles 104 may feature curved or arced surfaces (e.g., as illustrated by paddle 104D in FIG. 4). In some embodiments, paddles 104 may include segmented surfaces that have different orientations from one another. For example, paddle 104A in FIG. 4 is shown having three different segments that are arranged at varying angles relative to one another. In some embodiments, paddles 104 may have non-flat, non-smooth, or otherwise non-uniform surfaces and/or shapes. For example, paddle 104C in FIG. 4 is shown having a corrugated element. In some embodiments, paddles 104 may include porous materials and/or apertures. Although various specific paddles 104 with specific combinations of shapes and/or features have been described above, it should also be understood that any paddle 104 may include any combination of any of these described and/or illustrated features.

Figure 5:
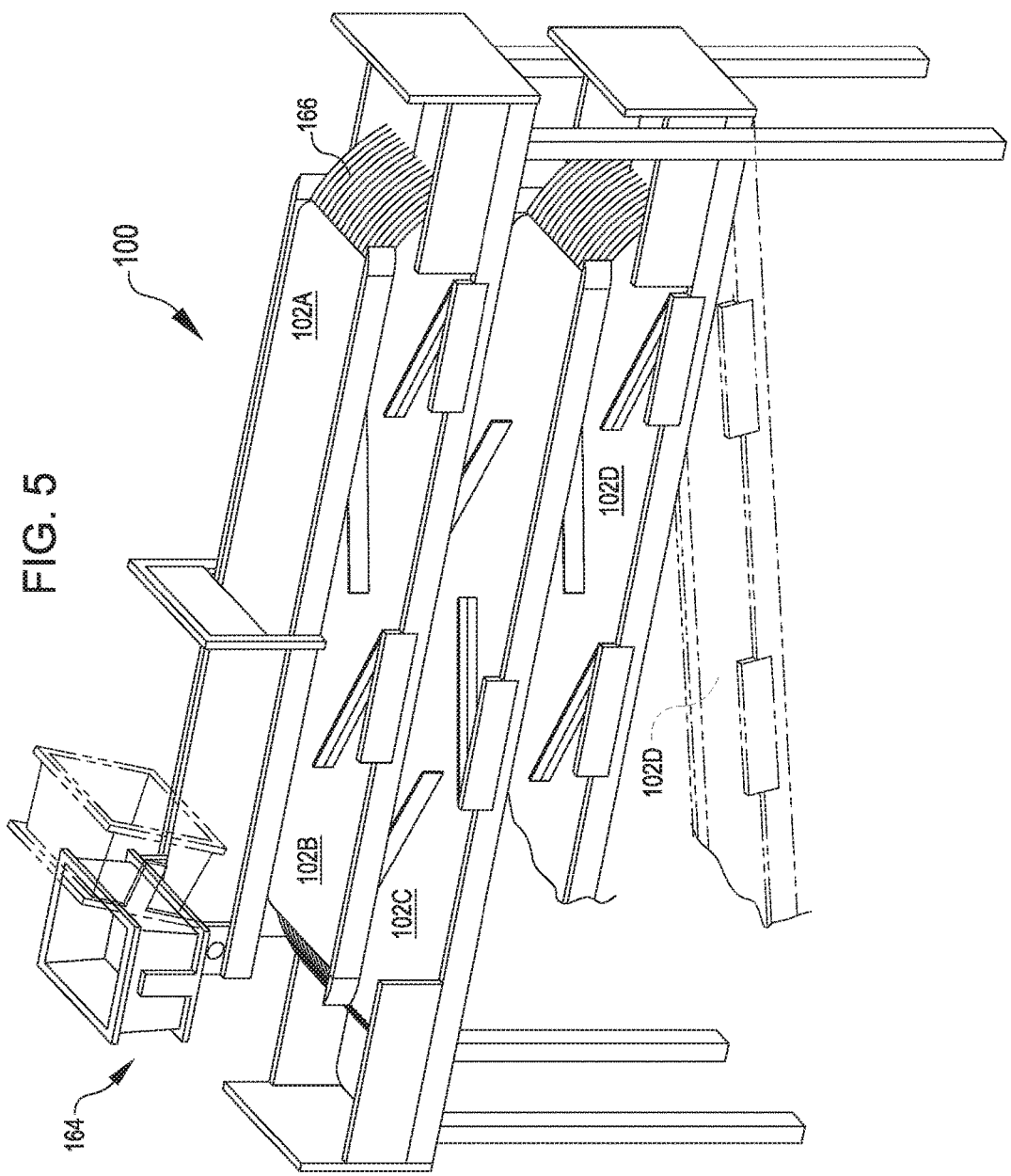
FIG. 5 illustrates a vertically stacked arrangement of conveyors within a singulation system according to certain embodiments.

FIG. 5 illustrates a vertically stacked arrangement of conveyors 102 within a singulation system 100 according to certain embodiments. In some embodiments, in addition to or in lieu of the arrangement of conveyors 102 shown in FIGS. 1-2, conveyors 102 may be stacked over one another, for example as shown in FIG. 5. In FIG. 5, the conveyors 102 may also provide changes in altitude, speed, and direction similar to those described with respect to FIG. 1 above. For example, the conveyors 102 in FIG. 5 provide a change of direction due to the conveyors 102 being arranged such that each successive conveyor advances items 110. in a direction parallel and opposite to a direction in which the immediately prior conveyor advances items 110. The arrangement of conveyors 102 in FIG. 5 may utilize various other features described above with respect to FIGS. 1-2, and as such, description here will not be here repeated. FIG. 5 also illustrates that the singulation system 100 may include a mechanism 164 for dumping items 110 from a tote or other container. However, the singulation system 100 is not limited to receiving items 110 by dumping from a tote (e.g., by human or automated intervention), but may receive items 110 by any other suitable method, including, but not limited to, placement of items 110 by hand by a human operator, placement of items 110 by a robotic manipulator, receiving items through a chute, conveyor, hopper, or other inducting or inputting device.

FIG. 5 also illustrates that the singulation system 100 may include dampers 166. The dampers 166 are illustrated as brush bristles through that will part under the momentum of falling items 110 to reduce a rate of dropping of the items 110. However, the dampers 166 may correspond to any structure positioned between vertically offset conveyors 102 and arranged to interact with items 110 while dropping between the conveyors 102 to reduce a rate of dropping.

FIG. 5 also illustrates that the singulation system 100 may include conveyors that are capable of altering orientation automatically. For example, although the conveyors 102 in FIG. 5 are primarily shown parallel to one another, the bottom-most conveyor 102D is shown as adjustable (e.g., to the position shown in phantom lines), for example, to change an inclination or other orientation of the conveyor 102D to cause items 110 to roll or otherwise move differently in a way that may facilitate singulation.

Figure 6:
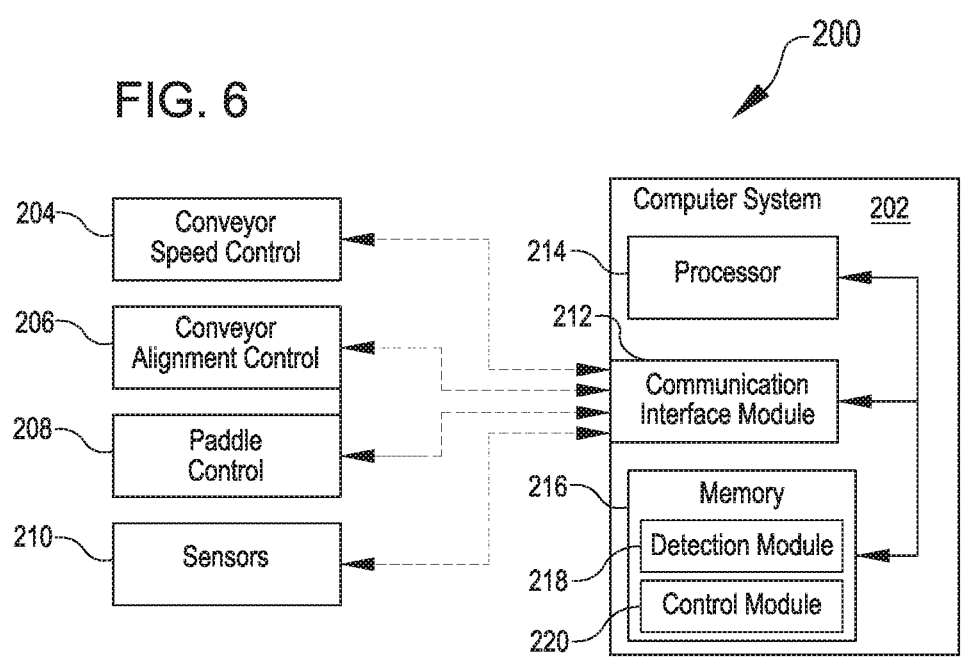
FIG. 6 is a block diagram illustrating components of a singulation system according certain embodiments.

FIG. 6 is a block diagram illustrating components of a singulation system 200 according certain embodiments. The singulation system 200 may be an example of the singulation system 100, described elsewhere herein. As shown in FIG. 6, the singulation system 200 includes a computer system 202, a conveyor speed control 204, a conveyor alignment control 206, a paddle control 208, and sensors 210. In general, the computer system 202 may function as a controller that controls other components of the singulation system 200, for example, as described further below.

The conveyor speed control 204 may correspond to motors or other elements capable of increasing or decreasing a speed of conveyors 102. The conveyor alignment control 206 may correspond to actuators or other elements capable of adjusting the alignment of the conveyors 102, which may include a relative angle and/or relative distance (such as height) between conveyors 102. The paddle control 208 may correspond to actuators or other elements capable of adjusting positioning or other functionality of the paddles 104. The sensors 210 may include the optical sensors 106, pressure sensors 163, or any other sensors that may obtain information about items 110 or other elements of the singulation system 100, which may include information about conveyor speed, paddle operation, conveyor alignment, or any other conditions or state information about components of the singulation system. The conveyor speed control 204, the conveyor alignment control 206, the paddle control 208, and the sensors 210 may function as appropriate inputs and/or outputs for control of the singulation system 200 by the computer system 202.

The illustrated computer system 202 includes a communication interface module 212, a processor 214, a memory 216, a detection module, and a control module 220. Computer system 15 may represent a single component, multiple components located at a central location within singulation system 200, or multiple components distributed throughout singulation system 200. In general, computer system 202 may include any appropriate combination of hardware and/or software suitable to provide the described functionality.

Processor 214 is operable to execute instructions associated with the functionality provided by computer system 202. Processor 214 may comprise one or more general purpose computers, dedicated microprocessors, or other processing devices capable of communicating electronic information. Examples of processor 214 include one or more application-specific integrated circuits (ASICs), field programmable gate arrays (FPGAs), digital signal processors (DSPs) and any other suitable specific or general purpose processors.

Memory 216 stores processor instructions, inventory requests, state information for the various components of singulation system 200 and/or any other appropriate values, parameters, or information utilized by computer system 202 during operation. Memory 216 may represent any collection and arrangement of volatile or nonvolatile, local or remote devices suitable for storing data. Examples of memory 216 include, but are not limited to, random access memory (RAM) devices, read only memory (ROM) devices, magnetic storage devices, optical storage devices or any other suitable data storage devices.

Communication interface module 212 facilitates communication between computer system 202 and other components of singulation system 200, including information and/or instructions conveyed between any of the conveyor speed control 204, conveyor alignment control 206, paddle control 208, sensors 210, detection module 218, and control module 220. These communications may represent communication of any form appropriate based on the capabilities of computer system 202 and may include any suitable information. Depending on the configuration of computer system 202, communication interface module 212 may be responsible for facilitating either or both of wired and wireless communication between computer system 202 and the various components of singulation system 200. In particular embodiments, computer system 202 may communicate using communication protocols such as 802.11, Bluetooth, or Infrared Data Association (IrDA) standards.

In general, the detection module 218, the control module 220, and the communication interface module 212 may each represent any appropriate hardware and/or software suitable to provide the described functionality. In addition, as noted above, computer system 202 may, in particular embodiments, represent multiple different discrete components and any or all of the detection module 218, the control module 220, and the communication interface module 212 may represent components physically separate from the remaining elements of computer system 202. Moreover, any two or more of the detection module 218, the control module 220, and the communication interface module 212 may share common components. For example, in particular embodiments, the detection module 218 and the control module 220 represent computer processes executing on processor 214 and communication interface module 212 comprises a wireless transmitter, a wireless receiver, and a related computer process executing on processor 214.

The detection module 218 may determine conditions present in the singulation system 200. For example, the detection module 218 may determine (e.g., based on an optical sensor 106) whether any jams have occurred at a particular paddle 104 that warrant actuating the paddle 104 to clear the jam. The detection module 218 may also determine a size of items 110 being conveyed on a part of a conveyor 102 (e.g., based on items 110 present on that part of the conveyor 102 within a field of view of the optical sensor 106). The detection module 218 may also determine the state of other elements within the singulation system 200, such as a speed or orientation at which a conveyor 102 is operating, or a position of a given a paddle 104.

The control module 220 may control components within the singulation system 200. For example, the control module 220 may send commands to the conveyor speed control 204, the conveyor alignment control 206, the paddle control 208, and the sensors 210 to control respective components of the singulation system 200. In various embodiments, the control module 220 may control components based on information provided by the detection module 218. For example, based on a jam detected by the detection module 218, the control module 220 may actuate a paddle 104, adjust a conveyor speed, adjust a conveyor orientation, etc. to cause the jam to clear. The control module 220 may implement additional changes based on the detection module 218 determining that the jam has cleared. In various embodiments, the control module 220 may adjust operating parameters based on the size or other parameters of items 110 determined to be present by the detection module 218. For example, the control module 220 may extend, retract, rotate, translate, or otherwise actuate a paddle 104 to narrow an open passage along a portion of a conveyor 102 to reduce a risk of detected multiple small-sized items from slipping by simultaneously. As another example, the control module 220 may actuate a paddle 104 to increase a size of an open passage to reduce a chance of a jam of a detected upcoming item 110 that is too large to fit through the open passage in the detected state of the paddle 104 prior to actuation. As further examples, the control module 220 may actuate a paddle 104 for vertical movement in response to a detected height of an item 110, for translation along the width of the conveyor 102 in response to a detected size of an item 110, for translation along the length of the conveyor 102 in response to a detected size of an item 110, for pivoting relative to of the conveyor 102 in response to a detected size of an item 110, for extending relative to of the conveyor 102 in response to a detected size of an item 110, for retracting relative to the conveyor 102 in response to a detected size of an item 110.

Based at least in part on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:
1. A singulation system comprising:
 a conveyor set comprising:
  a first conveyor extending along a first length, the first conveyor configured for advancing items received on the first conveyor along the first length of the first conveyor at a first speed in a first direction to sequentially drop said items off of the first conveyor; and
  a second conveyor being positioned below the first conveyor by a set height so as to receive the items dropped by the set height from the first conveyor, the second conveyor extending along a second length, the second conveyor configured for advancing items received on the second conveyor along the second length of the second conveyor at a second speed higher than the first speed and in a second direction different from the first direction, whereby space is increased between items that were sequentially adjacent one another on the first conveyor as a result of the set height between the first conveyor and the second conveyor, the difference in speed between the first speed and the second speed, and the difference in direction between the first direction and the second direction;

a plurality of paddles that are each respectively arranged for protruding over a respective portion of the conveyor set and that each respectively comprise a member selectively positionable among different positions relative to the respective portion of the conveyor set;

a sensor arranged to detect conditions relative to a part of the conveyor set associated with the sensor; and a controller comprising a processor and a non-transitory computer-readable medium comprising processor-executable instructions that, when executed by the processor, cause the processor to:

receive information from the sensor about an item detected on the part of the conveyor set associated with the sensor; and cause a respective paddle of the plurality of paddles to change position relative to the respective portion of the conveyor set based at least in part on the information from the sensor about the item detected on the part of the conveyor set associated with the sensor.

2. The singulation system of claim 1, wherein a paddle of the plurality of paddles is selectively positionable for at least one of:

vertical movement relative to the first conveyor;
translation along a width of the first conveyor;
pivoting about a pivot point of the paddle relative to the first conveyor;
translation along the first length of the first conveyor;
extending relative to the first conveyor; or
retracting relative to the first conveyor.

3. The singulation system of claim 1, further comprising a damper positioned between the first conveyor and the second conveyor and arranged to interact with items while dropping from the first conveyor to the second conveyor to reduce a rate of dropping.

4. The singulation system of claim 1, wherein the first length of the first conveyor and the second length of the second conveyor are arranged to advance the items in different directions.

5. A singulation system comprising:

a first conveyor extending along a first length, the first conveyor configured for advancing any items received on the first conveyor along the first length of the first conveyor at a first speed to sequentially drop said items off of the first conveyor;

a second conveyor positioned below the first conveyor by a set height so as to receive the items dropped by the set height from the first conveyor, the second conveyor extending along a second length, the second conveyor configured for advancing items received on the second conveyor along the second length of the second conveyor at a second speed, the second speed being higher than the first speed so as to increase space between items that were sequentially adjacent one another on the first conveyor;

a plurality of paddles that are each respectively arranged for protruding over a respective portion of the first conveyor and that each respectively comprise a member selectively positionable among different positions relative to the respective portion of the first conveyor;

a sensor arranged to detect conditions relative to a part of the first conveyor associated with the sensor; and a controller comprising a processor and a non-transitory computer-readable medium comprising processor-executable instructions to cause the processor to:

receive information from the sensor about an item detected on the part of the first conveyor associated with the sensor; and cause a respective paddle of the plurality of paddles to change position relative to the respective portion of the first conveyor based at least in part on the information from the sensor about the item detected on the part of the first conveyor associated with the sensor.

6. The singulation system of claim 5, wherein:

a paddle of the plurality of paddles is selectively positionable for vertical movement relative to the first conveyor; and the processor-executable instructions of the controller cause the processor to cause the paddle to move vertically in response to a height of the item detected by the sensor.

7. The singulation system of claim 5, wherein:

a paddle of the plurality of paddles is selectively positionable for translation along a width of the first conveyor; and the processor-executable instructions of the controller cause the processor to cause the paddle to translate along the width of the first conveyor in response to a size of the item detected by the sensor.

8. The singulation system of claim 5, wherein:

a paddle of the plurality of paddles is selectively positionable for pivoting about a pivot point of the paddle relative to the first conveyor; and the processor-executable instructions of the controller cause the processor to cause the paddle to pivot about the pivot point of the paddle relative to the first conveyor in response to a size of the item detected by the sensor.

9. The singulation system of claim 5, wherein:

a paddle of the plurality of paddles is selectively positionable for translation along the first length of the first conveyor; and the processor-executable instructions of the controller cause the processor to cause the paddle to translate along the first length of the first conveyor in response to a size of the item detected by the sensor.

10. The singulation system of claim 5, wherein:

a paddle of the plurality of paddles is selectively positionable for extending relative to the first conveyor; and the processor-executable instructions of the controller cause the processor to cause the paddle to extend relative to the first conveyor in response to a size of the item detected by the sensor.

11. The singulation system of claim 5, wherein:

a paddle of the plurality of paddles is selectively positionable for retracting relative to the first conveyor; and the processor-executable instructions of the controller cause the processor to cause the paddle to retract relative to the first conveyor in response to a size of the item detected by the sensor.

12. The singulation system of claim 5, wherein the processor-executable instructions of the controller cause the processor to cause the respective paddle to change position relative to the respective portion of the first conveyor in response to the information from the sensor indicating that the item detected by the sensor is jammed by the respective paddle from continued advancement by the first conveyor.

13. The singulation system of claim 5, wherein a paddle of the plurality of paddles has a curved surface.

14. The singulation system of claim 5, wherein a paddle of the plurality of paddles has segmented surfaces oriented at different angles relative to each other.

15. The singulation system of claim 5, wherein a paddle of the plurality of paddles includes a corrugated shape.

16. The singulation system of claim 5, wherein a paddle of the plurality of paddles includes apertures.

17. A method for singulation of a plurality of items, the method comprising:
- advancing the plurality of items on a first conveyor at a first speed in a first direction to sequentially drop the plurality of items off of the first conveyor, wherein advancing the plurality of items on the first conveyor comprises advancing the plurality of items relative to a plurality of paddles that are each arranged for protruding over a respective portion of the first conveyor;
- receiving the plurality of items dropped off the first conveyor onto a second conveyor positioned below the first conveyor; and
- advancing the plurality of items received on the second conveyor at a second speed higher than the first speed and in a second direction different from the first direction.

18. The method of claim 17, wherein the second direction is perpendicular to the first direction.

19. The method of claim 17, wherein the second direction is parallel and opposite to the first direction.

20. The method of claim 17, wherein the receiving the plurality of items dropped off the first conveyor onto the second conveyor comprises receiving the plurality of items onto the second conveyor after the plurality of items have interacted with dampers while dropping to reduce a rate of dropping.

21. The method of claim 17, wherein the plurality of paddles each respectively comprise a member selectively positionable among different positions relative to the respective portion of the first conveyor.

22. The method of claim 21, wherein the plurality of paddles are selectively positionable in response to input from a sensor arranged to detect conditions relative to a part of the first conveyor associated with the sensor.

23. A method for singulation of a plurality of items, the method comprising:
- advancing the plurality of items on a first conveyor at a first speed in a first direction to sequentially drop the plurality of items off of the first conveyor;
- receiving the plurality of items dropped off the first conveyor onto a second conveyor positioned below the first conveyor; and
- advancing the plurality of items received on the second conveyor at a second speed higher than the first speed and in a second direction different from the first direction, wherein the second direction is parallel and opposite to the first direction.

24. The method of claim 23, wherein the receiving the plurality of items dropped off the first conveyor onto the second conveyor comprises receiving the plurality of items onto the second conveyor after the plurality of items have interacted with dampers while dropping to reduce a rate of dropping.

25. The method of claim 23, wherein advancing the plurality of items on the first conveyor comprises advancing the plurality of items relative to a plurality of paddles that are each arranged for protruding over a respective portion of the first conveyor.

26. The method of claim 25, wherein the plurality of paddles each respectively comprise a member selectively positionable among different positions relative to the respective portion of the first conveyor.

27. The method of claim 26, wherein the plurality of paddles are selectively positionable in response to input from a sensor arranged to detect conditions relative to a part of the first conveyor associated with the sensor.

* * * * *

UNITED STATES PATENT AND TRADEMARK OFFICE
CERTIFICATE OF CORRECTION

PATENT NO. : 10,315,859 B1
APPLICATION NO. : 15/464087
DATED : June 11, 2019
INVENTOR(S) : Zhao et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 35 days.

Signed and Sealed this
Tenth Day of December, 2019

Andrei Iancu
*Director of the United States Patent and Trademark Office*